United States Patent
Yonetake et al.

(10) Patent No.: US 8,084,121 B2
(45) Date of Patent: Dec. 27, 2011

(54) FINE CARBON FIBER WITH LINEARITY AND RESIN COMPOSITE MATERIAL USING THE SAME

(75) Inventors: Koichiro Yonetake, Yamagata (JP); Tatsuhiro Takahashi, Yamagata (JP); Ryuji Yamamoto, Kanagawa (JP); Toshio Morita, Kanagawa (JP)

(73) Assignee: Showa Denko K.K., Tokyo (JP)

( * ) Notice: Subject to any disclaimer, the term of this patent is extended or adjusted under 35 U.S.C. 154(b) by 805 days.

(21) Appl. No.: 10/555,637

(22) PCT Filed: May 7, 2004

(86) PCT No.: PCT/JP2004/006502
§ 371 (c)(1),
(2), (4) Date: Nov. 4, 2005

(87) PCT Pub. No.: WO2004/099477
PCT Pub. Date: Nov. 18, 2004

(65) Prior Publication Data
US 2006/0286361 A1    Dec. 21, 2006

Related U.S. Application Data

(60) Provisional application No. 60/470,896, filed on May 16, 2003.

(30) Foreign Application Priority Data

May 9, 2003  (JP) .................................. 2003-131118

(51) Int. Cl.
*B32B 18/00* (2006.01)
*B32B 27/04* (2006.01)
*D01F 9/12* (2006.01)

(52) U.S. Cl. ..................... 428/299.1; 428/375; 428/367; 428/297.4; 423/447.2

(58) Field of Classification Search .................. None
See application file for complete search history.

(56) References Cited

U.S. PATENT DOCUMENTS 2,796,331 A    6/1957    Kauffman et al.
(Continued)

FOREIGN PATENT DOCUMENTS

EP    0 296 613 A2    12/1988
(Continued)

OTHER PUBLICATIONS

JP 2004360160 machine translation.*
(Continued)

*Primary Examiner* — Jill Gray
(74) *Attorney, Agent, or Firm* — Sughrue Mion, PLLC

(57) ABSTRACT

The fine carbon fiber obtained by pulverizing vapor grown fine carbon fiber, each fiber including a hollow space extending along its axis, and having an outer diameter of 1 to 1,000 nm, an aspect ratio of 5 to 1,000, and a BET specific surface area of 2 to 2,000 m$^2$/g, wherein the average interlayer distance ($d_{002}$) is 0.345 nm or less, and the ratio of the peak height (Id) of the band (e.g. 1,341 to 1,349 cm$^{-1}$) in a Raman scattering spectrum to that of the peak height (Ig) of the band (e.g. 1,570 to 1,578 cm$^{-1}$) (Id/Ig) is 0.1 to 2, a bending angle of 30° or less with respect to the axis; a composite material comprising the fine carbon fiber and a resin serving as a matrix, wherein the fine carbon fiber is oriented in one direction through, application of an external force; and a production method and use thereof. The linear fine carbon fiber of the present invention exhibits excellent dispersibility in a matrix and is readily oriented by application of an external force, and therefore, enables to produce a composite material, wherein merely the carbon fiber is or both the fine carbon fiber and the matrix resin are oriented in one direction.

13 Claims, 3 Drawing Sheets

U.S. PATENT DOCUMENTS

| | | | |
|---|---|---|---|
| 4,572,813 A | 2/1986 | Arakawa | |
| 4,923,637 A | 5/1990 | Yagi et al. | |
| 5,560,898 A | 10/1996 | Uchida et al. | |
| 5,830,566 A | 11/1998 | Kimura et al. | |
| 5,853,865 A | 12/1998 | McHugh et al. | |
| 6,103,373 A | 8/2000 | Nishimura et al. | |
| 6,489,026 B1 | 12/2002 | Nishimura et al. | |
| 6,528,211 B1 | 3/2003 | Nishimura et al. | |
| 6,709,566 B2 * | 3/2004 | Cumings et al. | 205/641 |
| 6,730,398 B2 | 5/2004 | Morita et al. | |
| 6,844,061 B2 | 1/2005 | Morita et al. | |
| 6,974,627 B2 | 12/2005 | Morita et al. | |
| 7,122,132 B2 | 10/2006 | Morita et al. | |
| 7,150,840 B2 | 12/2006 | Yamamoto et al. | |
| 7,150,911 B2 | 12/2006 | Morita et al. | |
| 7,390,593 B2 | 6/2008 | Yamamoto et al. | |
| 2002/0182505 A1 | 12/2002 | Yanagisawa et al. | |
| 2003/0096104 A1 | 5/2003 | Masayuki et al. | |
| 2003/0148097 A1 * | 8/2003 | Takikawa et al. | 428/364 |
| 2007/0138705 A1 * | 6/2007 | Mickelson et al. | 264/405 |

FOREIGN PATENT DOCUMENTS

| | | | |
|---|---|---|---|
| EP | 1 191 131 A1 | | 3/2002 |
| EP | 1849817 A1 * | | 10/2007 |
| JP | 60-27700 A | | 2/1985 |
| JP | 60-027700 A | | 2/1985 |
| JP | 63-282313 A | | 11/1988 |
| JP | 05-074452 A | | 3/1993 |
| JP | 5-78182 A | | 3/1993 |
| JP | 7-48111 A | | 2/1995 |
| JP | 7-150419 A | | 6/1995 |
| JP | 09-132846 A | | 5/1997 |
| JP | 2778434 B2 | | 5/1998 |
| JP | 11-322314 A | | 11/1999 |
| JP | 2000203819 | * | 7/2000 |
| JP | 2001-200211 A | | 7/2001 |
| JP | 2001-250894 A | | 9/2001 |
| JP | 2001-322139 A | | 11/2001 |
| JP | 2002-88257 A | | 3/2002 |
| JP | 2002-88591 A | | 3/2002 |
| JP | 2002088591 | * | 3/2002 |
| JP | 2002-273741 A | | 9/2002 |
| JP | 2003-051310 A | | 2/2003 |
| JP | 2004360160 A | * | 12/2004 |
| WO | WO 87/07559 A1 | | 12/1987 |
| WO | WO 98/39250 A1 | | 9/1998 |
| WO | WO 00/58536 A1 | | 10/2000 |

OTHER PUBLICATIONS

JP 2002088591 machine translation.*
"Bending buckling of single-walled carbon nanotubes by atomic-scale finite element" Guo et al.; Composites: Part B 39; Mar. 2007, p. 202-208.*
JP 2000203819 A machine translation.*
"Advances in the science and technology of carbon nanotubes and their composites: a review"; Thostenson et al., Composites Science and Technology 61; 2001, p. 1899-1912.*
"Electronic transport through bent carbon nanotubes: Nanoelectromechanical sensors and switches" Farajian et al., Physical Review B 67; May 2003, p. 1-6.*
Database WPI, Section Ch, Week 200258, Derwent Publications Ltd., London, GB; AN 2002-541081, XP002306013 & JP 2002 088591 A (Showa Denko KK), Mar. 27, 2002.
Patent Abstracts of Japan, vol. 0174, No. 06 (C-1090), Jul. 29, 1993 & JP 5 078182 A (Dainippon Ink & Chem Inc), Mar. 30, 1993.
Patton, et al., "Vapor grown carbon fiber composites with epoxy and poly (phenylene sulfide) matrices," *Composites Part A: Applied Science and Manufacturing* 30(9):1081-1091 (1999), XP004171653 ISSN: 1359-835X.
Pierard, et al., Production of short carbon nanotubes with open tips by ball milling, *Chem. Physics Letters* 335:1-8 (2001).

* cited by examiner

Linear fine carbon fiber (after pulverization)

1000 nm

50 μm

FINE CARBON FIBER WITH LINEARITY AND RESIN COMPOSITE MATERIAL USING THE SAME

CROSS REFERENCE TO THE RELATED APPLICATIONS

This is an application filed pursuant to 35 U.S.C. Section 111(a) with claiming the benefit of U.S. Provisional application Ser. No. 60/470,896 filed May 16, 2003 under the provision of 35 U.S.C. Section 111(b), pursuant to 35 U.S.C. Section 119(e)(1).

TECHNICAL FIELD

The present invention relates to fine carbon fiber exhibiting a straightness that ensures excellent orientation of the filaments (hereinafter the carbon fiber may be referred to simply as "linear fine carbon fiber"). More particularly, the present invention relates to linear fine carbon fiber which is obtained by thermally treating vapor grown fine carbon fiber in an inert atmosphere at a high temperature of 2,000° C. or higher, and subsequently pulverizing the thus-treated carbon fiber, thereby disintegrating entangled aggregates of fiber filaments or debranching branched fiber filaments; and to a composite material containing the linear fine carbon fiber and a matrix resin, wherein merely the fine carbon fiber is oriented or both the fine carbon fiber and the matrix resin are oriented.

The linear fine carbon fiber of the present invention exhibits excellent dispersibility in a matrix such as a resin. During the course of preparation of a resin composite material from the carbon fiber and a matrix resin, when an external force such as a magnetic field is applied to the composite material, the carbon fiber can be oriented in a specific direction. In addition, the matrix resin is oriented in a specific direction by the function of the carbon fiber. The resin composite material is suitable as a filler material employed for improving electrical conductivity, thermal conductivity, or tribological characteristics, etc.; as an electron emission material for producing a field emission display (FED); and as a material for forming a transparent electrode, an electromagnetic wave shielding material, an orientation film, etc.

BACKGROUND ART

Fine carbon fiber is used in a variety of composite materials, by virtue of its excellent properties such as high strength, high elastic modulus and high electrical conductivity. In recent years, in conjunction with developments in electronic techniques, fine carbon fiber has been considered a promising candidate for electrically conductive filler for producing an electromagnetic wave shielding material or an antistatic material, and has been envisaged as a filler for electrostatic coating to be applied to resin or a filler for a transparent, electrically conductive resin. Also, by virtue of its excellent tribological characteristics and wear resistance, fine carbon fiber has been envisaged to be applied in, for example, electric brushes and variable resistors. In addition, since fine carbon fiber exhibits high electrical conductivity, high thermal conductivity resistance and electromigration resistance, it has also become of interest as a wiring material for forming devices such as a large-scale integration (LSI).

Conventional carbon fiber (e.g., polyacrylonitrile (PAN)-based carbon fiber, pitch-based carbon fiber or cellulose-based carbon fiber), which is produced through carbonization of organic fiber through thermal treatment in an inert atmosphere, has a relatively large diameter of 5 to 10 μm and exhibits low electrical conductivity. Therefore, such carbon fiber is generally employed as a material for reinforcing resin, ceramic material, etc.

In the 1980's, studies were conducted on vapor grown carbon fiber produced through thermal decomposition of a gas such as hydrocarbon in the presence of a transition metal catalyst. Such a process has been successfully employed in production of carbon fiber having a diameter of about 0.1 to about 0.2 μm (about 100 to about 200 nm) and an aspect ratio of about 10 to about 500.

There has been disclosed fine carbon fiber produced through, for example, the following processes: a process in which an organic compound such as benzene, serving as a raw material, and an organo-transition metallic compound such as ferrocene, serving as a catalyst, are brought into a high-temperature reaction furnace together with a carrier gas, to thereby produce carbon fiber on a substrate (Japanese Laid-Open Patent Publication (kokai) No. 60-27700); a process in which carbon fiber is produced in a dispersed state (Japanese Laid-Open Patent Publication (kokai) No. 60-54998 (U.S. Pat. No. 4,572,813); or a process in which carbon fiber is grown on a reaction furnace wall serving as a base (Japanese Laid-Open Patent Publication (kokai) No. 7-150419).

When such fine carbon fiber is thermally treated at 2,000° C. or higher, crystallinity of the carbon fiber is considerably enhanced (i.e., the carbon fiber is readily graphitized), and the carbon fiber exhibits improved electrical conductivity. Therefore, the thus-treated carbon fiber is employed as an electrically conductive filler material; for example, as a filler for resin or as an additive in secondary batteries.

A characteristic feature of a fiber filament of such fine carbon fiber resides in its shape and crystal structure. The fiber filament has a cylindrical structure including a very thin hollow space in its center portion, and a plurality of graphene sheets (hexagonal carbon layers) grown around the hollow space so as to form concentric cylinders in the form of growth rings. Meanwhile, in the case of carbon fiber which has been thermally treated at 2,000° C. or higher, the cross section of a fiber filament of the carbon fiber assumes a polygonal shape, and in some cases, the distance among the graphene sheets enlarge to form void spaces.

Fiber filaments of such fine carbon fiber have a small diameter, and thus have a large aspect ratio. In general, the fiber filaments are entangled with one another, forming fluffy aggregates.

For example, when fine carbon fiber is grown by means of CVD (chemical vapor deposition) on a reaction furnace wall serving as a base, since a raw material containing a metallic catalyst is continuously supplied onto fine carbon fiber grown on the reaction furnace wall, fine carbon fiber is further grown on the previously grown carbon fiber, which serves as a base, to thereby yield a product in a shape like a tree covered with ice.

In the case of the aforementioned fine carbon fiber having a large aspect ratio or branched fine carbon fiber like an ice-covered tree, fiber filaments of the carbon fiber strongly interact with one another, and thus the fiber filaments are entangled or engaged with one another, forming fluffy or blocky aggregates. Therefore, when such fine carbon fiber is mixed with a matrix such as a resin or a ceramic material to thereby prepare a composite material, the fine carbon fiber fails to be uniformly dispersed in the matrix, and the resultant composite material fails to achieve intended electrical, thermal and mechanical characteristics.

When fine carbon fiber of low bulk density containing such fluffy or blocky aggregates is kneaded with a resin to thereby prepare a composite material, and a thin piece of the composite material is observed under an optical microscope or a transmission electron microscope, the thin piece is found to have numerous black dots attributed to the aggregates contained in the fine carbon fiber. The aggregates which are not dispersed in the resin substantially serve as neither an electrically conductive path nor a thermally conductive path in the composite. Therefore, in order to form an electrically conductive path or a thermally conductive path in the composite material, the amount of the fine carbon fiber to be added to the resin must be increased to a level higher than that calculated by means of, for example, simulation. However, when the amount of the fine carbon fiber added to the resin is increased as described above, other problems arise, including reduction of elasticity of the resin, and reduction of adhesion between the resin and a substrate.

Methods to efficiently achieve electrical, thermal and mechanical characteristics of a resin composite material without deteriorating the mechanical characteristics include a method for making fine carbon fiber oriented in a resin. According to this method, even when a small amount of fine carbon fiber is added to a resin, an electrically conductive path or a thermally conductive path can be formed in the resultant resin composite material.

A method for making fine carbon fiber oriented in a resin is molding the carbon fiber and the resin into a product under unidirectional application of pressure. For example, when a mixture of the aforementioned fine carbon fiber and resin is subjected to molding under pressure by use of an extruder, the fine carbon fiber can be oriented in the resin in the extrusion direction (Japanese Laid-Open Patent Publication (kokai) No. 2001-250894). In this method, since shear stress arises during the course of kneading, aggregates of carbon fiber filaments can be disintegrated to a certain extent. However, in this method, the aggregates are not positively disintegrated, and therefore, some aggregates still remain in the molded product. When fiber filaments of the carbon fiber oriented in the molded product are observed in detail under a microscope, the fiber filaments in the resin are found to be oriented in a direction parallel to the extrusion direction as a whole, but most of the thus-oriented fiber filaments are found to be inclined within an angle of ±30° with respect to the extrusion direction. Therefore, in order to improve characteristics of the resin composite material, the orientation degree of the carbon fiber must be enhanced.

Another method for making fine carbon fiber oriented in a resin is adding fine carbon fiber to a resin such as a thermosetting resin, and applying a magnetic field to the resultant mixture (Japanese Laid-Open Patent Publication (kokai) No. 2002-88257, Japanese Laid-Open Patent Publication (kokai) No. 2001-322139, and Japanese Laid-Open Patent Publication (kokai) No. 2002-273741). This method utilizes a characteristic feature of fine carbon fiber; i.e., magnetism in the axial direction of the carbon fiber differs from that in the radial direction thereof. The diamagnetic susceptibility in a direction parallel to the axial direction of the carbon fiber is lower than that in the radial direction thereof, and in general, a diamagnetic substance repels a magnetic field, to thereby stabilize energy in the system. Therefore, the carbon fiber axis is oriented in a direction of a magnetic field; i.e., a direction in which diamagnetic magnetization is reduced to a minimum level.

Conventional fine carbon fiber such as carbon nano-tube has a very high aspect ratio and a curved structure. Therefore, when such conventional fine carbon fiber is mixed with a resin, even if a magnetic field is applied to the resultant mixture, the carbon fiber fails to achieve sufficient orientation. In the case of fine carbon fiber containing aggregates of fiber filaments, fiber filaments which adhere to one another by van der Waals force can be oriented by means of a magnetic field, but fiber filaments which are entangled with one another fail to be oriented. Meanwhile, in the case of branched fine carbon fiber, branched fiber filaments interfere with one another, thereby inhibiting rearrangement of the filaments in the direction of a magnetic field. Therefore, when a molded product is formed from such fine carbon fiber, anisotropy of physical properties of the molded product; i.e., the ratio of properties in the direction of a magnetic field to those in a direction perpendicular to the magnetic field, becomes small.

DISCLOSURE OF THE INVENTION

Objects of the present invention are to provide linear fine carbon fiber which can be readily oriented by means of an external force, and to provide a resin composite material containing the carbon fiber. In order to make the linear fine carbon fiber exhibit excellent dispersibility, adhesion, electrical conductivity, thermal conductivity and tribological characteristics when mixed with a matrix such as a resin, the linear fine carbon fiber is produced by thermally treating vapor grown fine carbon fiber at a temperature of 2,000° C. or higher for development of a graphite structure, and subsequently slightly pulverizing the thus-treated carbon fiber, thereby disintegrating entangled aggregates of fiber filaments or debranching branched fiber filaments.

In order to enhance orientation degree of fine carbon fiber in a matrix through application of an external force such as a magnetic field, firstly, the anisotropic magnetic susceptibility in the axial direction (longitudinal direction) and in the radial direction of the carbon fiber (difference of the magnetic susceptibility in the axial direction and in the radial direction) must be increased, and secondly, interference/interaction between fiber filaments of the carbon fiber must be reduced such that the fiber filaments can freely rotate or migrate in the matrix.

In order to solve the aforementioned problems, the present inventors have found that when fine carbon fiber obtained through thermal decomposition of hydrocarbon and the like is thermally treated at a high temperature of 2,000° C. or higher for development of crystallinity, and subsequently the thus-treated carbon fiber is pulverized, linear fine carbon fiber can be produced in which interaction between fiber filaments of the carbon fiber is small. The present inventors have also found that by adding the linear fine carbon fiber to a resin and applying an external force such as a magnetic field to the resultant mixture, a resin composite material can be prepared, wherein the carbon fiber and the resin serving as a matrix are highly oriented, and that the composite material exhibits excellent electrical conductivity and thermal conductivity.

Accordingly, the present invention provides a linear fine carbon fiber which can be highly oriented in a matrix, and a resin composite material comprising the carbon fiber, as described below.

1. A fine carbon fiber having linearity, each fiber filament of the carbon fiber having a bending angle of 30° or less with respect to the longitudinal direction of the fiber filament.
2. The fine carbon fiber according to 1 above, each fiber filament of the carbon fiber including a hollow space extending along its axis, and having an outer diameter of 1 to 1,000 nm, an aspect ratio of 5 to 1,000, and a BET specific surface area of 2 to 2,000 m$^2$/g, wherein the average interlayer distance ($d_{002}$) of the carbon fiber at a (002) plane is 0.345 nm or less as measured by means of X-ray diffractometry, and the ratio of the peak height (Id) of the band at 1,341 to 1,349 cm$^{-1}$ in a Raman scattering spectrum of the carbon fiber to that of the peak height (Ig) of the band at 1,570 to 1,578 cm$^{-1}$ in the spectrum; i.e., Id/Ig, is 0.1 to 2.

3. The fine carbon fiber according to 1 or 2 above, which has a broken surface at a portion thereof.

4. The fine carbon fiber according to any one of 1 through 3 above, wherein boron is contained in an amount of 0.001 to 5 mass % in the interior of or on the surface of crystals constituting the carbon fiber.

5. The fine carbon fiber according to any one of 1 through 4 above, which has, on at least a portion of a surface thereof, an electrically conductive material layer and/or a metallic or magnetic material layer which responds to a weak magnetic field.

6. The fine carbon fiber according to any one of 1 through 5 above, which has, on a surface thereof, an oxygen-containing functional group.

7. The fine carbon fiber according to any one of 1 through 6 above, wherein the anisotropic magnetic susceptibility is $1 \times 10^{-4}$ or more.

8. A fine carbon fiber comprising, in an amount of 10 vol. % to 90 vol. % on the basis of the entirety thereof, the fine carbon fiber having linearity as recited in any one of 1 through 7 above, each fiber filament of the carbon fiber having a bending angle of 30° or less.

9. A composite material formed of fine carbon fiber and resin, comprising the fine carbon fiber having linearity as recited in any one of 1 through 8 above, each fiber filament of the carbon fiber having a bending angle of 30° or less, and a resin serving as a matrix, wherein merely the fine carbon fiber is oriented in one direction through application of an external force to the composite material.

10. A composite material formed of fine carbon fiber and resin, comprising the fine carbon fiber having linearity as recited in any one of 1 through 8, each fiber filament of the carbon fiber having a bending angle of 30° or less, and a resin serving as a matrix, wherein both the fine carbon fiber and the matrix resin are oriented in one direction through application of an external force to the composite material.

11. A composite material formed of fine carbon fiber and resin, comprising the fine carbon fiber having linearity as recited in any one of 1 through 8 above, each fiber filament of the carbon fiber having a bending angle of 30° or less, and a resin serving as a matrix, wherein the fine carbon fiber is aligned in one direction through application of an external force to the composite material, and the matrix resin is oriented in the same direction as the carbon fiber, the orientation being induced by alignment of the carbon fiber.

12. A composite material formed of fine carbon fiber and resin, comprising the fine carbon fiber having linearity as recited in any one of 1 through 8 above, each fiber filament of the carbon fiber having a bending angle of 30° or less, and a resin serving as a matrix, wherein the fine carbon fiber is aligned in one direction through application of a magnetic field to the composite material, and the matrix resin is oriented in the same direction as the carbon fiber, the orientation being induced by alignment of the carbon fiber.

13. The composite material formed of fine carbon fiber and resin according to 9 or 10 above, wherein the amount of the fine carbon fiber having linearity is 1 to 30 mass %.

14. The composite material formed of fine carbon fiber and resin according to any one of 9 through 11 above, which comprises carbon fiber, each fiber filament thereof having an outer diameter of 5 to 50 μm, in an amount of 5 to 80 mass % in addition to the fine carbon fiber.

15. The composite material formed of fine carbon fiber and resin according to any one of 9 through 11 above, wherein the resin is a thermosetting resin, a photo-curing resin or a thermoplastic resin.

16. A method for producing a composite material formed of fine carbon fiber and resin, wherein the fine carbon fiber is oriented in one direction, which method is characterized by comprising applying an external force to a resin composition containing a fine carbon fiber having linearity.

17. A method for producing the composite material formed of fine carbon fiber and resin according to 16 above, wherein the external force is a magnetic field.

18. An electrically conductive material comprising the composite material formed of fine carbon fiber and resin as recited in any one of 9 through 15 above.

19. A thermally conductive material comprising the composite material formed of fine carbon fiber and resin as recited in any one of 9 through 15 above.

20. A material exhibiting tribological characteristics comprising the composite material formed of fine carbon fiber and resin as recited in any one of 9 through 15 above.

21. A fiber-reinforced structural material comprising the composite material formed of fine carbon fiber and resin as recited in any one of 9 through 15 above.

The present invention will next be described in detail.

The linear fine carbon fiber of the present invention was discovered in the course of studies on conditions for thermal treatment and pulverization of vapor grown fine carbon fiber in order to make the carbon fiber exhibit excellent dispersibility, orientation, electrical conductivity, thermal conductivity and tribological characteristics when mixed with a matrix such as a resin. In the linear fine carbon fiber of the present invention, interaction between fiber filaments of the carbon fiber is small. Therefore, the linear fine carbon fiber is readily oriented through application of an external force such as a magnetic field, and exhibits the effect of enhancing orientation of a matrix resin.

The composite material formed of fine carbon fiber and resin (hereinafter may be referred to simply as "the resin composite material") of the present invention exhibits excellent electrical conductivity, thermal conductivity and tribological characteristics, and therefore, the composite material can be employed in electrically conductive materials, thermally conductive materials, materials exhibiting tribological characteristics, fiber-reinforced structural materials, etc.

The linear fine carbon fiber of the present invention can be employed as a filler for forming transparent electrodes, or employed in heat radiation components of electronic devices, heat transmission components, and components exhibiting tribological characteristics of precision instruments such as a microgear. In addition, the linear fine carbon fiber can be employed as an electromagnetic wave shielding material, or an electrical-conductivity-imparting material in, for example, secondary batteries; or employed in emitters for FEDs. Furthermore, the linear fine carbon fiber can be employed as a material for imparting electrical conductivity to the surface of an OPC drum, a printed-circuit board, etc.

The linear fine carbon fiber of the present invention will now be described with reference to accompanying drawings (FIGS. 1 through 3). In FIG. 1, a fiber filament of the fine carbon fiber is schematically shown by a solid line. FIG. 1 is a schematic view showing a fiber filament of the linear fine carbon fiber. The angle of deviation from a line (reference numeral 1 in FIG. 1) extending in the longitudinal direction of the filament is defined as "bending angle" (reference numeral 2 in FIG. 1), and fine carbon fiber constituted by fiber filaments having a bending angle of 30° or less is defined as linear fine carbon fiber. The bending angle is preferably 1 to 30°, more preferably 2 to 25°. Fiber filaments having different bending angles exist in carbon fiber as a collective entity, but preferably the carbon fiber contains substantially no fiber filaments having a bending angle of 50° or more. In the case where fine carbon fiber constituted by fiber filaments having a bending angle of 30° or more is mixed with a resin, when an external force such as a magnetic field is applied to the resultant mixture, the fiber filaments come into contact with one another, making it difficult to orient the fine carbon fiber in the resin.

In the case of fine carbon fiber obtained by thermally treating vapor grown fine carbon fiber in an argon atmosphere at 2,800° C., as shown in a scanning electron micrograph (×15,000) of FIG. 2, a plurality of fine carbon fiber filaments extend from one fine carbon fiber filament in all directions. Furthermore, as shown in the micrograph, some adjacent fine carbon fiber filaments are bonded together. In such branched fine carbon fiber, fiber filaments of the carbon fiber fail to be separated from one another. Therefore, the branched fine carbon fiber cannot be uniformly dispersed in a matrix such as a resin, nor oriented by means of an external force.

FIG. 3 shows a scanning electron micrograph (×15,000) of fine carbon fiber obtained by thermally treating vapor grown fine carbon fiber in an argon atmosphere at 2,800° C., and subsequently pulverizing the thus-treated carbon fiber by use of a high-speed rotary mill, thereby debranching branched fiber filaments and disintegrating bonded or aggregated fiber filaments. This linear fine carbon fiber can be uniformly dispersed in a resin, since interaction between fiber filaments of the carbon fiber is small. In addition, the linear fine carbon fiber can be highly oriented through application of a magnetic field.

As described above, the linear fine carbon fiber of the present invention can be obtained by thermally treating vapor grown fine carbon fiber in an inert atmosphere at 2,800° C., and subsequently by pulverizing the thus-treated carbon fiber. For example, when the thermally-treated fine carbon fiber is pulverized by means of impact force within a short period of time, aggregates of fiber filaments of the carbon fiber and branched fiber filaments are disintegrated and debranched, and the resultant carbon fiber exhibits high dispersibility in a resin. Furthermore, when impact force, compression force, shear force, and friction force are applied to the fine carbon fiber over a long period of time, the resultant carbon fiber exhibits a small aspect ratio. When the fine carbon fiber having a small aspect ratio is employed, the time required for orienting the carbon fiber in a resin can be shortened.

In general, the vapor grown fine carbon fiber employed in the present invention can be produced by thermally decomposing an organic compound by use of an organo-transition metallic compound.

Examples of the organic compound which may serve as a raw material of the fine carbon fiber include toluene, benzene, naphthalene, ethylene, acetylene, ethane, gasses such as natural gas and carbon monoxide, and mixtures thereof. Of these, aromatic hydrocarbons such as toluene and benzene are preferred.

An organo-transition metallic compound contains a transition metal serving as a catalyst, and is an organic compound containing, as a transition metal, a metal belonging to Group IVa, Va, VIa, VIIa or VIII of the periodic table. An organo-transition metallic compound such as ferrocene or nickelocene is preferred.

In the present invention, a sulfur compound may be employed as a promoter. Examples of the sulfur compound which may be employed include sulfur (elementary substance), thiophene and various thiols.

The fine carbon fiber is produced through the following procedure: the aforementioned organic compound and organo-transition metallic compound, and if desired, a promoter are mixed with a reducing gas such as hydrogen, and the resultant mixture is fed into a reaction furnace heated to 800 to 1,300° C., to thereby allow reaction to proceed.

By regulating the ratio between the organic compound and the reducing gas, the diameter of the resultant carbon fiber can be controlled.

The raw material can be fed into a reaction furnace by means of, for example, the following method: a method in which the raw material is gasified and then fed into a reaction furnace; a method in which the raw material is sprayed in the form of liquid into a reaction furnace by use of a carrier gas (reducing gas); or a method in which the raw material is gasified by use of a purge gas (i.e., a portion of a carrier gas), and then fed into a reaction furnace. Preferably, there is employed the method in which the raw material is sprayed in the form of liquid into a reaction furnace by use of a carrier gas.

In order to enhance adhesion of the fine carbon fiber to a matrix such as a resin, the carbon fiber may be subjected to thermal treatment (firing) in an inert atmosphere at 900 to 1,300° C., to thereby remove organic substances such as tar deposited on the surface of the fine carbon fiber.

Furthermore, in order to improve the anisotropic magnetic susceptibility of the fine carbon fiber, the carbon fiber may be thermally treated in an inert atmosphere at 2,000 to 3,500° C., to thereby enhance crystallinity thereof.

The fine carbon fiber may be thermally treated by use of any furnace, so long as the furnace can maintain a target temperature of 2,000° C. or higher, preferably 2,300° C. or higher. The furnace may be a generally employed furnace, such as an Acheson furnace, a resistance furnace and a high-frequency furnace. If desired, a method for heating powder or a molded material through direct application of electricity may be employed.

Thermal treatment is carried out in a non-oxidative atmosphere, preferably in an atmosphere of one or more of rare gasses such as argon, helium and neon. From the viewpoint of productivity, thermal treatment is preferably carried out within as brief a period as possible. When fine carbon fiber is heated over a long period of time, the carbon fiber is sintered to form aggregate, resulting in low production yield. Therefore, after the center of fine carbon fiber is heated to a target temperature, the carbon fiber does not need to be maintained at the temperature for more than one hour.

Each fiber filament of the linear fine carbon fiber of the present invention includes a hollow space extending along its axis, and has an outer diameter of 1 to 1,000 nm (preferably 10 to 200 nm), an aspect ratio of 5 to 1,000 (preferably 5 to 500, more preferably 10 to 200), and a BET specific surface area of 2 to 2,000 $m^2/g$ (preferably 10 to 200 $m^2/g$). The average interlayer distance ($d_{002}$) of the carbon fiber at a (002) plane is 0.345 nm or less, preferably 0.336 to 0.340 nm, as measured by means of X-ray diffractometry. The ratio of the peak height (Id) of the band, for example, from 1,341 to 1,349 $cm^{-1}$ or in the vicinity thereof in a Raman scattering spectrum of the carbon fiber to that of the peak height (Ig) of the band, for example, from 1,570 to 1,578 $cm^{-1}$ or in the vicinity thereof in the spectrum; i.e., Id/Ig, is 0.1 to 2. When the carbon fiber is not doped with, for example, boron (described below), the ratio Id/Ig is preferably 0.1 to 0.5, whereas when the carbon fiber is doped with, for example, boron, the ratio Id/Ig is preferably 0.6 to 1.5. The anisotropic magnetic susceptibility of the linear fine carbon fiber of the present invention is preferably $1 \times 10^{-4}$ or more, more preferably $2 \times 10^{-4}$ or more.

When the BET specific surface area is more than 2,000 $m^2/g$, the carbon fiber fails to be sufficiently coated with a matrix. Therefore, when a resin composite material is prepared from such carbon fiber, the composite material exhibits lowered electrical conductivity, thermal conductivity and mechanical strength.

When long carbon fiber having an aspect ratio (i.e., the ratio of the length to the outer diameter of the carbon fiber) of more than 1,000 is dispersed in a resin and oriented through application of an external force, fiber filaments of the carbon fiber come into contact with one another, and thus the carbon fiber fails to exhibit sufficient orientation.

When the $d_{002}$ as measured by means of X-ray diffractometry is more than 0.345 nm; i.e., graphite crystals are incompletely formed, and therefore sufficient anisotropic magnetic susceptibility (for example, $1 \times 10^{-4}$ or more) fails to be obtained, and the fine carbon fiber tends not to be oriented by a magnetic field.

In order to enhance dispersibility in a matrix such as a resin, the thus-graphitized fine carbon fiber, which contains aggregates of fiber filaments and branched fiber filaments, is subjected to pulverization treatment. In order to disintegrate aggregates of fiber filaments and debranch branched fiber filaments of the fine carbon fiber, thereby enhancing dispersibility of the carbon fiber in a resin, a pulverization apparatus such as a pulverizer, a novorotor, a pin mill, a turbo mill, a centrifugal classification mill or an annular mill can be employed. In order to further obtain fine carbon fiber having a low aspect ratio and exhibiting high orientation, a pulverization apparatus such as a vibration mill, a ball mill, a planetary mill, a jet mill or a colloid mill can be employed. The linear fine carbon fiber of the present invention, which is obtained through pulverization treatment, contains a fiber filament having a portion formed through cutting off a branch on its surface, or a fiber filament having a broken surface at its end.

In order to further develop crystallinity and improve electrical conductivity of the fine carbon fiber, during the course of thermal treatment in an inert atmosphere at 2,000 to 3,500° C., the carbon fiber may be mixed with a boron compound such as boron carbide ($B_4C$), boron oxide ($B_2O_3$), elemental boron, boric acid ($H_3BO_3$) and a borate.

No particular limitations are imposed on the amount of a boron compound added to the fine carbon fiber, since the amount varies in accordance with chemical properties and physical properties of the boron compound. For example, when boron carbide ($B_4C$) is employed, the amount of boron carbide is 0.05 to 10 mass %, preferably 0.1 to 5 mass %, on the basis of the entirety of the fine carbon fiber which has undergone pulverization. When the fine carbon fiber is thermally treated in the presence of a boron compound, crystallinity (interlayer distance $d_{002}$) of carbon constituting the thus-graphitized fine carbon fiber is enhanced, and the carbon fiber exhibits enhanced electrical conductivity.

The amount of boron contained in the interior of or on the surface of crystals constituting the fine carbon fiber is 0.001 to 5 mass %, preferably 0.01 to 5 mass %, more preferably 0.1 to 3 mass %. In order to improve electrical conductivity of the fine carbon fiber or affinity of the carbon fiber to a resin, preferably, boron in an amount of 0.1 mass % or more is added to the carbon fiber. However, since the amount of boron which can be substituted for carbon in graphene sheets is about 3 mass %, when boron in an amount of 3 mass % or more (particularly 5 mass % or more) is added to the fine carbon fiber, boron is present in the carbon fiber in the form of boron carbide or boron oxide, which may cause lowering of electrical conductivity.

In order to improve electrical conductivity and/or anisotropic magnetic susceptibility of the fine carbon fiber, an electrically conductive material layer and/or a metallic or magnetic material layer which responds to a weak magnetic field may be provided on at least a portion of the surface of the carbon fiber. For example, during the course of pulverization of the fine carbon fiber, the carbon fiber may be mixed with particles of a metal such as iron, cobalt and nickel, particles of an intermetallic compound containing such a metal, or particles of an oxide of such a metal, to thereby mechanochemically deposit the particles on the surface of the carbon fiber.

Alternatively, a metal such as iron, cobalt and nickel, an intermetallic compound containing such a metal, or an oxide of such a metal may be deposited on the surface of the fine carbon fiber by means such as CVD, PVD (physical vapor deposition), electroplating, chemical plating, molten metal injection and the sol-gel method.

In order to improve hydrophilicity of the fine carbon fiber, and enhance affinity of the carbon fiber to a matrix, the carbon fiber may be subjected to oxidation treatment, to thereby introduce, onto the carbon fiber surface, an oxygen-containing functional group; for example, a phenolic hydroxyl group, a carboxyl group, a quinone group or a lactone group. The oxidation treatment methods include air oxidation; i.e., thermal treatment in air at 500° C. to 700° C.; and a method employing an oxidizing agent; for example, ozone, an oxo acid, a peroxide such as hydrogen peroxide, or a halogen such as bromine or chlorine.

The fine carbon fiber of the present invention encompasses fine carbon fiber containing the aforementioned fine carbon fiber having linearity, each fiber filament of the carbon fiber having a bending angle of 30° or less in an amount of 10 to 90 vol. %.

The amount of the linear fine carbon fiber contained in the resin composite material of the present invention is preferably 1 to 30 mass %. When the amount is less than 1 mass %, sufficient electrically conductive and thermally conductive paths fail to be formed in the resin composite material, whereas when the amount is more than 30 mass %, fiber filaments of the carbon fiber come into contact with one another in the matrix, whereby the carbon fiber encounters difficulty in migrating or rotating in the matrix, and the carbon fiber fails to exhibit sufficient orientation.

No particular limitations are imposed on the resin to be employed in the resin composite material of the present invention, but preferably, a thermosetting resin, a photo-curing resin or a thermoplastic resin is employed.

Examples of the thermosetting resin which may be employed include polyamide, polyether, polyester, polyimide, polysulfone, epoxy resin, unsaturated polyester resin and phenolic resin. Examples of the thermoplastic resin which may be employed include nylon resin, polyethylene resin, polyamide resin, polyester resin, polycarbonate resin and polyarylate resin.

The time required for orienting the fine carbon fiber varies in accordance with the viscosity of the resin. The higher the viscosity of the matrix resin, the longer the time required for orienting the fine carbon in a direction of a magnetic field. The viscosity of the resin employed in the resin composite material of the present invention is preferably 1 to 1,000 Pa·s, more preferably 5 to 100 Pa·s.

The methods to orient the fine carbon fiber in the resin composite material of the present invention include a flow- or shear-based method such as extrusion molding; or a method employing a magnetic field or an electric field. Of these, a magnetic field orientation method using anisotropic magnetic susceptibility of the fine carbon fiber, which has linearity and a developed graphite crystal structure, is preferred, since the method can efficiently and highly orient the carbon fiber. Means to generate a magnetic field include a permanent magnet and an electromagnet. The magnetic flux density of the magnetic field is preferably 0.1 to 50 tesla, more preferably 0.5 to 30 tesla, much more preferably 1 to 20 tesla.

The matrix resin can be oriented in the resin composite material of the present invention by curing a thermosetting resin or by annealing (thermally treating) a thermoplastic resin at a temperature in the vicinity of the melting temperature (Tm) of the resin, while the linear fine carbon fiber is oriented by means of, for example, a magnetic field. Through such a process, the matrix resin is oriented in the longitudinal direction of the linear fine carbon fiber, which serves as a nucleus for orientation of the matrix resin.

The resin composite material of the present invention may contain, in addition to the aforementioned fine carbon fiber, carbon fiber (each fiber filament of the carbon fiber having an outer diameter of 5 to 50 µm) in an amount of 5 to 80 mass %.

The present invention will next be described in more detail with reference to representative examples, which should not be construed as limiting the invention thereto.

The linearity of linear fine carbon fiber (bending angle with respect to the longitudinal direction of the carbon fiber) was calculated through analysis of a bright field image of the carbon fiber obtained by observation under a scanning microscope.

The measurement method of the anisotropic magnetic susceptibility includes the three typical methods as follows:
(1) SQUID method (superconducting quantum interference device measurement, for example, accurate magnetic measuring device MPMS-XLNS7 min (product of Quantum Design Japan),
(2) magnetic rotation torque meter method, and
(3) suspension method.

It is experimentally confirmed that the values measured by each method are virtually the same (Jpn. J. Appl. Phys. Vol 40, 2237 (2001)).

In the suspension method, for example, carbon fibers are dispersed in a solvent (the density of the solvent is adjusted to the same as that of the carbon fiber, generally by dissolving calcium bromide in water), and the mixture is spin-oriented within a magnetic field using the electromagnet TM-WV8615MRC-156 (product of Tamagawa Co., Ltd.). The anisotropic magnetic susceptibility can be calculated from the rotation rate, aspect ratio and the viscosity of the solvent.

Specifically, the anisotropic magnetic susceptibility $\chi_a$ can be determined by the following formula:

$$\chi_a = 6\eta\mu/\{\tau F(D)B^2\}$$

$\eta$: viscosity of the solvent
$F(D)$: form factor calculated from aspect ratio and the like
$\mu_0$: magnetic permeability in vacuo
$B$: magnetic flux density
$\tau$: rotation time

EXAMPLE 1

Production of Linear Fine Carbon Fiber

Benzene, ferrocene and sulfur (proportion by mass: 92:7:1) were mixed together, to thereby prepare a liquid raw material. The liquid raw material was sprayed, by use of hydrogen serving as a carrier gas, into a reaction furnace (inner diameter: 100 mm, height: 2,500 mm) which had been heated to 1,200° C. The feed amount of the raw material and the flow rate of the hydrogen were regulated to 10 g/min and 60 L/min, respectively.

Figure 1:
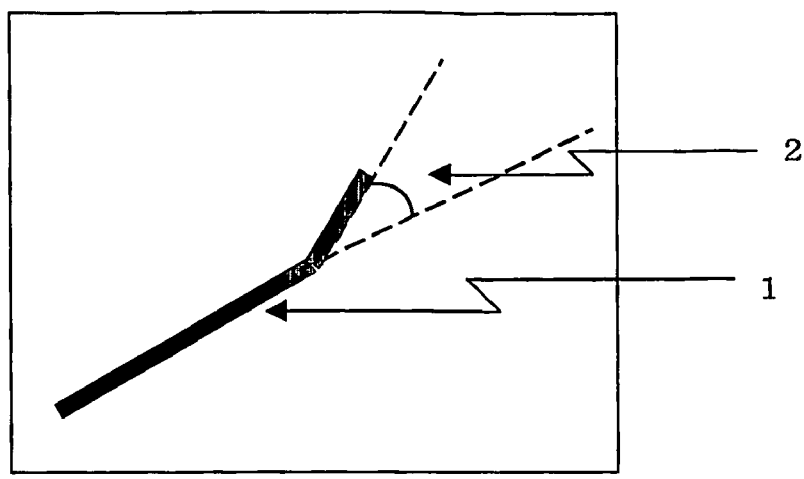
FIG. 1 is a schematic cross-sectional view showing the structure of a fiber filament of the linear fine carbon fiber of the present invention.
Figure 2:
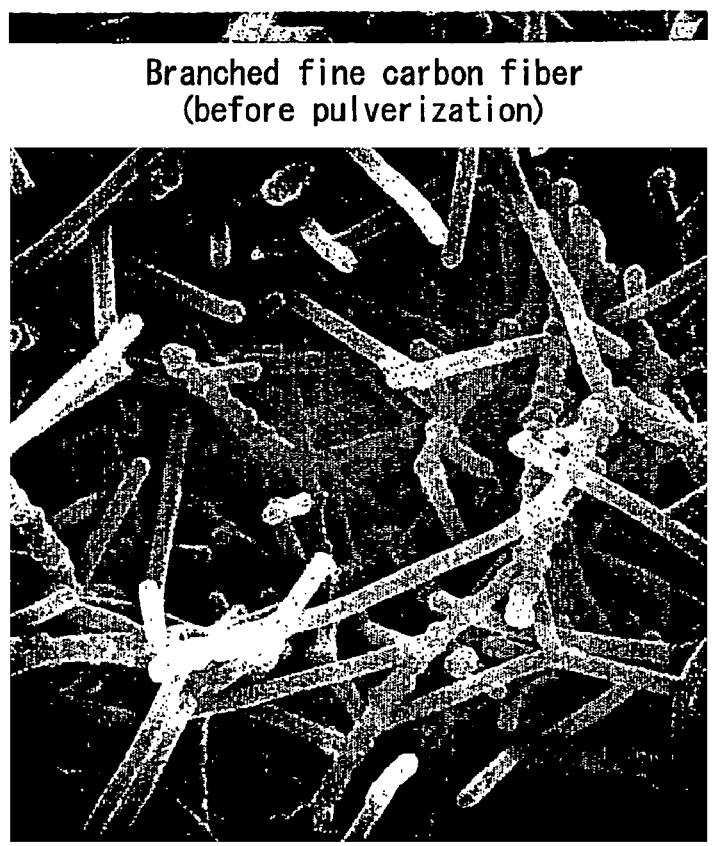
FIG. 2 shows a scanning electron micrograph (×15,000) of the branched fine carbon fiber prepared in Example 1, the carbon fiber having not undergone pulverization.

The product obtained through the above process (150 g) was charged into a graphite-made crucible (inner diameter: 100 mm, height: 150 mm), and fired in an argon atmosphere at 1,000° C. for one hour. Thereafter, the resultant product was graphitized in an argon atmosphere at 2,800° C. for one hour, to thereby yield a reaction product (graphitized carbon fiber). The carbon fiber was found to have an average diameter of 200 nm, an aspect ratio of 150, and a BET specific surface area of 10 m$^2$/g; the $d_{002}$ as measured by means of X-ray diffractometry was found to be 0.339 nm; and the ratio of the peak height (Id) of the band at 1,341 to 1,349 cm$^{-1}$ in a Raman scattering spectrum of the carbon fiber to that of the peak height (Ig) of the band at 1,570 to 1,578 cm$^{-1}$ in the spectrum; i.e., Id/Ig, was found to be 0.15. FIG. 2 shows a scanning electron micrograph (×15,000) of the reaction product.

Figure 3:
FIG. 3 shows a scanning electron micrograph (×15,000) of the linear fine carbon fiber produced in Example 1, the carbon fiber having undergone pulverization.

The reaction product (60 g) and stainless steel balls (diameter: 10 mm) were placed in a stainless steel container (inner volume: 2,000 cm$^3$), and the product was pulverized by use of a vibration mill (MB1-type vibration mill, product of Chuo Kakohki Co., Ltd.) for 10 minutes, to thereby produce graphitized fine carbon fiber having an average diameter of 200 nm and an aspect ratio of 50, each fiber filament of the carbon fiber having a bending angle of 20° or less with respect to the main axis of the filament. FIG. 3 shows a scanning electron micrograph (×15,000) of the graphitized fine carbon fiber.

The anisotropic magnetic susceptibility of the graphitized fine carbon fiber measured by the suspension method was 3.11×10$^{-4}$

EXAMPLE 2

Production of Linear Fine Carbon Fiber

Benzene, ferrocene and sulfur (proportion by mass: 92:7:1) were mixed together, to thereby prepare a liquid raw material. The liquid raw material was sprayed, by use of hydrogen serving as a carrier gas, into a reaction furnace (inner diameter: 100 mm, height: 2,500 mm) which had been heated to 1,200° C. The feed amount of the raw material and the flow rate of the hydrogen were regulated to 10 g/min and 200 L/min, respectively.

The product obtained through the above process (150 g) was charged into a graphite-made crucible (inner diameter: 100 mm, height: 150 mm), and fired in an argon atmosphere at 1,000° C. for one hour. Thereafter, the resultant product was graphitized in an argon atmosphere at 2,800° C. for 30 minutes, to thereby yield graphitized carbon fiber having an average diameter of 20 nm and an aspect ratio of 150.

The carbon fiber (60 g) and stainless steel balls (diameter: 10 mm) were placed in a stainless steel container (inner volume: 2,000 cm$^3$), and the carbon fiber was pulverized by use of a vibration mill (MB1-type vibration mill, product of Chuo Kakohki Co., Ltd.) for 10 minutes, to thereby produce graphitized fine carbon fiber having an average diameter of 20 nm and an aspect ratio of 50, each fiber filament of the carbon fiber having a bending angle of 20° or less with respect to the main axis of the filament.

EXAMPLE 3

Production of Linear Fine Carbon Fiber

Benzene, ferrocene and thiophene (proportion by mass: 91:7:2) were mixed together, to thereby prepare a liquid raw material. The liquid raw material was sprayed, by use of hydrogen serving as a carrier gas, into a reaction furnace (inner diameter: 100 mm, height: 2,500 mm) which had been heated to 1,200° C. The feed amount of the raw material and the flow rate of the hydrogen were regulated to 5 g/min and 60 L/min, respectively.

The product obtained through the above process (150 g) was charged into a graphite-made crucible (inner diameter: 100 mm, height: 150 mm), and fired in an argon atmosphere at 1,000° C. for one hour. Thereafter, the resultant product was graphitized in an argon atmosphere at 2,800° C. for 30 minutes, to thereby yield graphitized carbon fiber having an average diameter of 200 nm and an aspect ratio of 1,200.

By use of Microjet (product of Yakushin Kikai Seisakusho), the above-obtained carbon fiber (100 g/min) was made pass through a rotary mill whose pulverization wings were rotated at 10,000 rpm, and the carbon fiber was pulverized, to thereby produce graphitized fine carbon fiber having an average diameter of 200 nm and an aspect ratio of 900, each fiber filament of the carbon fiber having a bending angle of 20° or less with respect to the main axis of the filament.

COMPARATIVE EXAMPLE 1

Production of Fine Carbon Fiber for Comparison

Benzene, ferrocene and sulfur (proportion by mass: 92:7:1) were mixed together, to thereby prepare a liquid raw material. The liquid raw material was gasified at 180° C., and the gasified raw material was fed, by use of hydrogen serving as a carrier gas, into a reaction furnace (inner diameter: 100 mm, height: 2,500 mm) which had been heated to 1,200° C. The feed amount of the raw material and the flow rate of the hydrogen were regulated to 10 g/min and 60 L/min, respectively.

The product obtained through the above process (150 g) was charged into a graphite-made crucible (inner diameter: 100 mm, height: 150 mm), and fired in an argon atmosphere at 1,000° C. for one hour. Thereafter, the resultant product was graphitized in an argon atmosphere at 2,800° C. for one hour, to thereby yield curved, graphitized carbon fiber having an average diameter of 200 nm and an aspect ratio of 150.

The carbon fiber (60 g) and stainless steel balls (diameter: 10 mm) were placed in a stainless steel container (inner volume: 2,000 cm$^3$), and the carbon fiber was pulverized by use of a vibration mill (MB1-type vibration mill, product of Chuo Kakohki Co., Ltd.) for 10 minutes, to thereby produce graphitized fine carbon fiber having an average diameter of 200 nm and an aspect ratio of 50, each fiber filament of the carbon fiber having a bending angle of 40° or more with respect to the main axis of the filament.

Table 1 shows the diameter, aspect ratio and bending angle of each of the graphitized fine carbon fibers of Examples 1 through 3 and Comparative Example 1.

TABLE 1

|  | Example 1 | Example 2 | Example 3 | Comparative Example 1 |
| --- | --- | --- | --- | --- |
| Fiber diameter (nm) | 200 | 20 | 200 | 200 |
| Aspect ratio | 50 | 50 | 900 | 50 |
| Bending angle | 20° or less | 20° or less | 20° or less | 40° or more |

EXAMPLE 4

Figure 5:
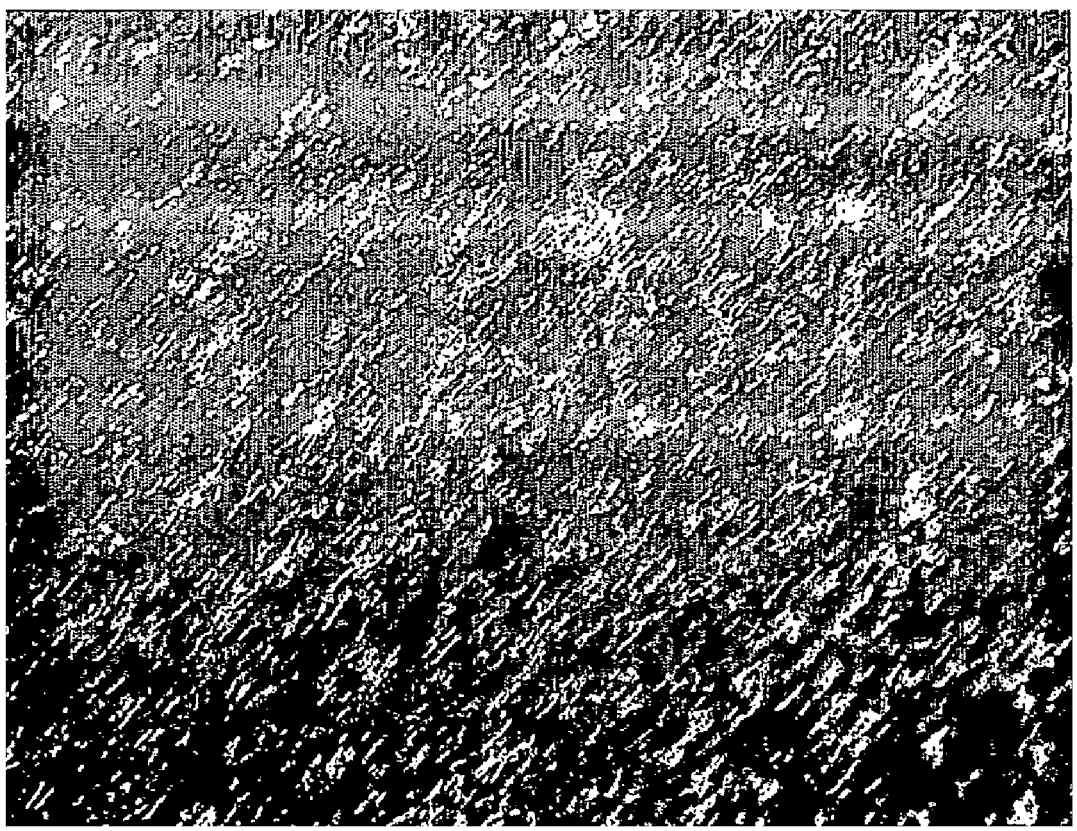
FIG. 5 shows an optical micrograph (×400) of the resin composite material produced in Example 4, in which the linear fine carbon fiber and the resin are oriented in the direction of the magnetic field.

The linear, graphitized fine carbon fiber prepared in Example 1 (10 mass %) was mixed with an unsaturated polyester resin (90 mass %), and the resultant mixture was degassed under vacuum, to thereby prepare a resin composition. The resin composition was placed in a predetermined die, and a magnetic field (magnetic flux density: 10 tesla) was applied such that the direction of lines of magnetic force coincides with the thickness direction of a molded product, to thereby make the graphitized fine carbon fiber sufficiently oriented in the molded product. Thereafter, the molded product was cured under heating, to thereby produce a plate-like resin composite material (2.0 mm in thickness×20 mm in length×20 mm in width). The orientation of the fine carbon fiber after application of the magnetic field, and the electrical conductivity and thermal conductivity of the resin composite material were evaluated by means of the below-described methods. The results are shown in Table 2. FIG. 5 shows an optical micrograph (×400) of the resin composite material containing the fine carbon fiber oriented in the direction of the magnetic field.

(1) Orientation of Fine Carbon Fiber after Application of Magnetic Field

A sample obtained by slicing the resin composite material was observed under an optical microscope or a transmission electron microscope. Orientation of the fine carbon fiber was evaluated by the following criteria depending on the amount of fiber filaments of the carbon fiber which have an orientation angle of ±10° with respect to a direction parallel to the magnetic field direction:

◯: 80% or more;
Δ: 60% or more; and
x: less than 50%.

(2) Electrical Conductivity

Figure 4:
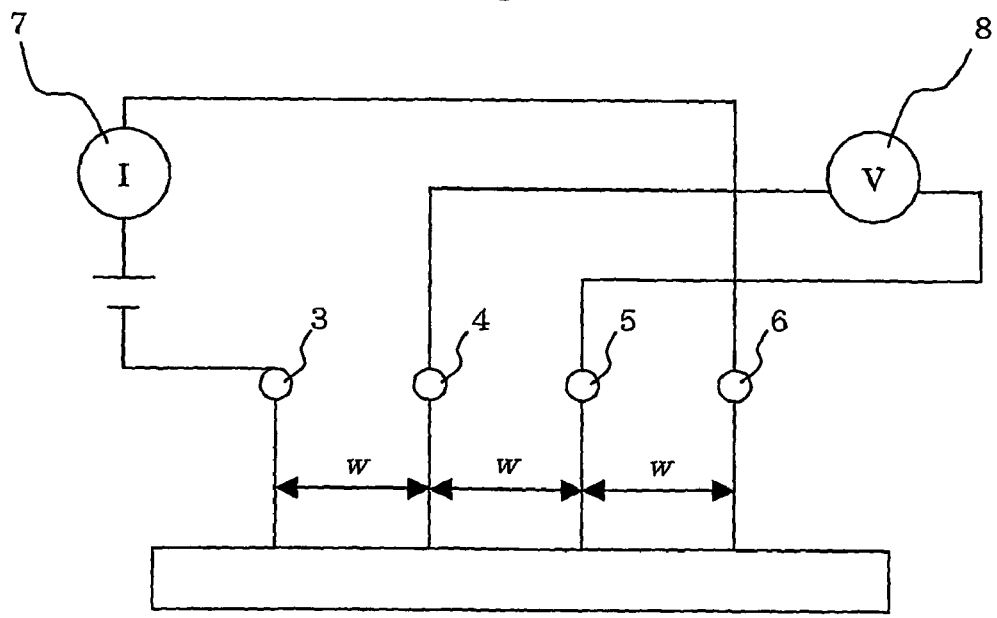
FIG. 4 is an explanatory view showing a resistance measurement process by means of the four-terminal method.

The electrical conductivity of the resin composite material was determined by means of the four-terminal method. FIG. 4 shows a process for measuring the electrical conductivity by means of the four-terminal method. As shown in FIG. 4, a constant current (I) from a constant-current source (reference numeral 7) flows via two outer terminals (reference numerals 3 and 6) through the sample, and a voltage (V) between the two inner terminals (reference numerals 4 and 5) which are provided at even intervals (w) is measured by use of a voltmeter (reference numeral 8) having high input impedance. The electrical conductivity (σ) was calculated from these values by use of the following equation (1).

$$\sigma = I/(2\pi \times w \times V) \quad (1)$$

(3) Thermal conductivity

The thermal conductivity of the resin composite material was determined by means of the thermal-AC method. A sample is sandwiched between electrodes, and AC voltage is applied to one of the electrodes, to thereby heat one surface of the sample. Change in the sample temperature is detected by means of change in the resistance of the other electrode. The phase difference (Δθ) of the temperature change (ΔT) was determined by response delay. The thermal diffusion coefficient (α) was calculated by use of the following equation (2), and the thermal conductivity (λ) was calculated by use of the following equation (3).

$$\Delta\theta = \sqrt{\pi f/\alpha} \times d + \pi/4 \quad (2)$$

Δθ: phase difference of temperature change
f: heating frequency
d: sample thickness
α: thermal diffusion coefficient $$\lambda = \alpha C p \times \rho \quad (3)$$

λ: thermal conductivity
α: thermal diffusion coefficient
Cp: heat capacity
ρ: density

EXAMPLE 5

In a manner similar to that of Example 4, a plate-like resin composite material was produced from the graphitized fine carbon fiber prepared in Example 2 (10 mass %) and an unsaturated polyester resin (90 mass %). In a manner similar to that of Example 4, the thus-produced sample was evaluated in terms of (1) orientation of the fine carbon fiber after application of a magnetic field, (2) electrical conductivity, and (3) thermal conductivity. The results are shown in Table 2.

EXAMPLE 6

In a manner similar to that of Example 4, a plate-like resin composite material was produced from the graphitized fine carbon fiber prepared in Example 3 (10 mass %) and an unsaturated polyester resin (90 mass %). In a manner similar to that of Example 4, the thus-produced sample was evaluated in terms of (1) orientation of the fine carbon fiber after application of a magnetic field, (2) electrical conductivity, and (3) thermal conductivity. The results are shown in Table 2.

COMPARATIVE EXAMPLE 2

In a manner similar to that of Example 4, a plate-like resin composite material was produced from the graphitized fine carbon fiber prepared in Comparative Example 1 (10 mass %) and an unsaturated polyester resin (90 mass %). In a manner similar to that of Example 4, the thus-produced sample was evaluated in terms of (1) orientation of the fine carbon fiber after application of a magnetic field, (2) electrical conductivity, and (3) thermal conductivity. The results are shown in Table 2.

COMPARATIVE EXAMPLE 3

The graphitized fine carbon fiber prepared in Example 1 (10 mass %) was mixed with an unsaturated polyester resin (90 mass %), and the resultant mixture was degassed under vacuum, to thereby prepare a resin composition. The resin composition was placed in a predetermined die, and cured under heating without application of a magnetic field, to thereby produce a plate-like resin composite material (2.0 mm in thickness×20 mm in length×20 mm in width). In a manner similar to that of Example 4, the thus-produced sample was evaluated in terms of (1) orientation of the fine carbon fiber after application of a magnetic field, (2) electrical conductivity, and (3) thermal conductivity. The results are shown in Table 2.

TABLE 2

|  | Example 4 | Example 5 | Example 6 | Comparative Example 2 | Comparative Example 3 |
|---|---|---|---|---|---|
| Magnetic field (T) | 10 | 10 | 10 | 10 | None |
| Orientation of carbon fiber | ○ | ○ | Δ | x | x |
| Electrical conductivity (Ω · cm) | $5 \times 10^0$ | $3 \times 10^{-1}$ | $6 \times 10^0$ | $1 \times 10^1$ | $6 \times 10^1$ |
| Thermal conductivity (W/m · K) | 2.0 | 2.5 | 2.2 | 1.5 | 1.0 |

EXAMPLE 7

The linear, graphitized fine carbon fiber prepared in Example 1 (5 mass %) was mixed with polycarbonate (95 mass %) to thereby prepare a resin composition, and the resin composition was placed in a predetermined die. The resin composition was heated to 300° C. at a rate of 10° C./min and maintained at 300° C. for 60 minutes, and a magnetic field (magnetic flux density: 3 tesla) was applied such that the direction of lines of magnetic force Coincides with the thickness direction of a molded product. Thereafter, the molded product was cooled to room temperature at a rate of 10° C./min, to thereby produce a plate-like resin composite material (2.0 mm in thickness×20 mm in length×20 mm in width). The orientations of the fine carbon fiber and the resin after application of the magnetic field were evaluated by means of X-ray diffractometry. The results are shown in Table 3.

The orientations of the fine carbon fiber and the resin were evaluated by use of orientation order parameter (S) obtained through X-ray diffractometry.

$$S = \frac{1}{2} \times (3 \langle \cos^2\theta \rangle - 1)$$

θ: angle of deviation from the orientation axis

When the carbon fiber or the polymer is completely randomly arranged, S becomes zero. As the carbon fiber or the polymer is oriented, S approaches 1, and when the carbon fiber or the polymer is completely oriented (θ=0), S becomes 1 (see "Liquid Crystal Polymer" authored by Naoyuki Koide and Kunisuke Sakamoto, Kyoritsu Shuppan Co., Ltd., 1988, pp. 15 and 16).

EXAMPLE 8

The linear, graphitized fine carbon fiber prepared in Example 1 (5 mass %) was mixed with polycarbonate (95 mass %) to thereby prepare a resin composition, and the resin composition was placed in a predetermined die. The resin composition was heated to 300° C. at a rate of 10° C./min and maintained at 300° C. for 60 minutes. Thereafter, the resin composition was cooled to 220° C. at a rate of 10° C./min and maintained at 220° C. for 120 minutes, and a magnetic field (magnetic flux density: 3 tesla) was applied such that the direction of lines of magnetic force coincides with the thickness direction of a molded product. Thereafter, the molded product was cooled to room temperature at a rate of 10° C./min to thereby produce a plate-like resin composite material (2.0 mm in thickness×20 mm in length×20 mm in width). The orientations of the fine carbon fiber and the resin after application of the magnetic field were evaluated by means of X-ray diffractometry. The results are shown in Table 3.

COMPARATIVE EXAMPLE 4

Polycarbonate was placed in a predetermined die, and heated to 300° C. at a rate of 10° C./min and maintained at 300° C. for 60 minutes. Thereafter, the polycarbonate was cooled to 220° C. at a rate of 10° C./min and maintained at 220° C. for 120 minutes, and a magnetic field (magnetic flux density: 3 tesla) was applied such that the direction of lines of magnetic force coincides with the thickness direction of a molded product, followed by cooling to room temperature at a rate of 10° C./min, to thereby produce a plate-like resin molded product (2.0 mm in thickness×20 mm in length×20 mm in width). The orientation of the resin after application of the magnetic field was evaluated by means of X-ray diffractometry. The results are shown in Table 3.

TABLE 3

|  | Example 7 | Example 8 | Comparative Example 4 |
|---|---|---|---|
| Magnetic field (T) | 3 | 3 | 3 |
| Orientation of carbon fiber | 0.64 | 0.64 | — |
| Orientation of resin | 0.02 | 0.65 | 0.01 |

INDUSTRIAL APPLICABILITY

The linear fine carbon fiber of the present invention exhibits excellent dispersibility in a matrix such as a resin and is readily oriented by application of an external, and therefore, enables to produce a composite material using the carbon fiber, wherein merely the carbon fiber is or both the fine carbon fiber and the matrix resin are oriented in one direction.

The invention claimed is:

1. A composite material formed of fine carbon fiber and resin, comprising a graphitized fine carbon fiber having linearity, each fiber filament of the carbon fiber having a bending angle of 30° or less with respect to the longitudinal direction of the fiber filament, wherein each fiber filament of the carbon fiber includes a hollow space extending along its axis, and has an outer diameter of 1 to 1,000 nm, an aspect ratio of 5 to 1,000, and a BET specific surface area of 2 to 2,000 m$^2$/g, wherein the average interlayer distance ($d_{002}$) of the carbon fiber at a (002) plane is 0.345 nm or less as measured by means of X-ray diffractometry, and the ratio of the peak height (Id) of the band at 1,341 to 1,349 cm$^{-1}$ in a Raman scattering spectrum of the carbon fiber to that of the peak height (Ig) of the band at 1,570 to 1,578 cm$^{-1}$ in the spectrum; i.e., Id/Ig, is 0.1 to 2, wherein merely the fine carbon fiber is oriented in one direction through application of an external force to the composite material, and
wherein the fine carbon fiber has a broken surface at a portion thereof.

2. The composite material formed of fine carbon fiber and resin according to claim 1, wherein the amount of the fine carbon fiber having linearity is 1 to 30 mass %.

3. The composite material formed of fine carbon fiber and resin according to claim 1, which comprises carbon fiber, each fiber filament thereof having an outer diameter of 5 to 50 µm, in an amount of 5 to 80 mass % in addition to the fine carbon fiber.

4. The composite material formed of fine carbon fiber and resin according to claim 1, wherein the resin is a thermosetting resin, a photo-curing resin or a thermoplastic resin.

5. An electrically conductive material comprising the composite material formed of fine carbon fiber and resin as claimed in claim 1.

6. A thermally conductive material comprising the composite material formed of fine carbon fiber and resin as claimed in claim 1.

7. A material exhibiting tribological characteristics comprising the composite material formed of fine carbon fiber and resin as claimed in claim 1.

8. A fiber-reinforced structural material comprising the composite material formed of fine carbon fiber and resin as claimed in claim 1.

9. A composite material formed of fine carbon fiber and resin, comprising a graphitized fine carbon fiber having linearity, each fiber filament of the carbon fiber having a bending angle of 30° or less with respect to the longitudinal direction of the fiber filament, wherein each fiber filament of the carbon fiber includes a hollow space extending along its axis, and has an outer diameter of 1 to 1,000 nm, an aspect ratio of 5 to 1,000, and a BET specific surface area of 2 to 2,000 m$^2$/g, wherein the average interlayer distance ($d_{002}$) of the carbon fiber at a (002) plane is 0.345 nm or less as measured by means of X-ray diffractometry, and the ratio of the peak height (Id) of the band at 1,341 to 1,349 cm$^{-1}$ in a Raman scattering spectrum of the carbon fiber to that of the peak height (Ig) of the band at 1,570 to 1,578 cm$^{-1}$ in the spectrum; i.e., Id/Ig, is 0.1 to 2, wherein both the fine carbon fiber and the matrix resin are oriented in one direction through application of an external force to the composite material, and
wherein the fine carbon fiber has a broken surface at a portion thereof.

10. A composite material formed of fine carbon fiber and resin, comprising a graphitized fine carbon fiber having linearity, each fiber filament of the carbon fiber having a bending angle of 30° or less with respect to the longitudinal direction of the fiber filament, wherein each fiber filament of the carbon fiber includes a hollow space extending along its axis, and has an outer diameter of 1 to 1,000 nm, an aspect ratio of 5 to 1,000, and a BET specific surface area of 2 to 2,000 m$^2$/g, wherein the average interlayer distance ($d_{002}$) of the carbon fiber at a (002) plane is 0.345 nm or less as measured by means of X-ray diffractometry, and the ratio of the peak height (Id) of the band at 1,341 to 1,349 cm$^{-1}$ in a Raman scattering spectrum of the carbon fiber to that of the peak height (Ig) of the band at 1,570 to 1,578 cm$^{-1}$ in the spectrum; i.e., Id/Ig, is 0.1 to 2, wherein the fine carbon fiber is aligned in one direction through application of an external force to the composite material, and the matrix resin is oriented in the same direction as the carbon fiber, the orientation being induced by alignment of the carbon fiber, and
wherein the fine carbon fiber has a broken surface at a portion thereof.

11. A composite material formed of fine carbon fiber and resin, comprising a graphitized fine carbon fiber having linearity, each fiber filament of the carbon fiber having a bending angle of 30° or less with respect to the longitudinal direction of the fiber filament, wherein each fiber filament of the carbon fiber includes a hollow space extending along its axis, and has an outer diameter of 1 to 1,000 nm, an aspect ratio of 5 to 1,000, and a BET specific surface area of 2 to 2,000 m$^2$/g, wherein the average interlayer distance ($d_{002}$) of the carbon fiber at a (002) plane is 0.345 nm or less as measured by means of X-ray diffractometry, and the ratio of the peak height (Id) of the band at 1,341 to 1,349 cm$^{-1}$ in a Raman scattering spectrum of the carbon fiber to that of the peak height (Ig) of the band at 1,570 to 1,578 cm$^{-1}$ in the spectrum; i.e., Id/Ig, is 0.1 to 2, wherein the fine carbon fiber is aligned in one direction through application of a magnetic field to the composite material, and the matrix resin is oriented in the same direction as the carbon fiber, the orientation being induced by alignment of the carbon fiber, and wherein the fine carbon fiber has a broken surface at a portion thereof.

12. A method for producing a composite material formed of fine carbon fiber and resin, wherein the fine carbon fiber is oriented in one direction, which method is characterized by comprising applying an external force to a resin composition containing a fine carbon fiber having linearity, and wherein the fine carbon fiber is a graphitized fine carbon fiber, each fiber filament of the carbon fiber having a bending angle of 30° or less with respect to the longitudinal direction of the fiber filament, wherein each fiber filament of the carbon fiber includes a hollow space extending along its axis, and has an outer diameter of 1 to 1,000 nm, an aspect ratio of 5 to 1,000, and a BET specific surface area of 2 to 2,000 m$^2$/g, wherein the average interlayer distance ($d_{002}$) of the carbon fiber at a (002) plane is 0.345 nm or less as measured by means of X-ray diffractometry, and the ratio of the peak height (Id) of the band at 1,341 to 1,349 cm$^{-1}$ in a Raman scattering spectrum of the carbon fiber to that of the peak height (Ig) of the band at 1,570 to 1,578 cm$^{-1}$ in the spectrum; i.e., Id/Ig, is 0.1 to 2, and wherein the fine carbon fiber has a broken surface at a portion thereof.

13. A method for producing the composite material formed of fine carbon fiber and resin according to claim 12, wherein the external force is a magnetic field.

* * * * *